(12) United States Patent
Kunath et al.

(10) Patent No.: US 9,147,285 B2
(45) Date of Patent: Sep. 29, 2015

(54) SYSTEM FOR VISUALIZING THREE DIMENSIONAL OBJECTS OR TERRAIN

(75) Inventors: Peter Kunath, Munich (DE); Alexey Pryakhin, Munich (DE); Marek Strassenburg-Kleciak, Munich (DE); Thomas Feldbauer, Regensburg (DE); Vladimir Ivanov, Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 222 days.

(21) Appl. No.: 13/564,276

(22) Filed: Aug. 1, 2012

(65) Prior Publication Data

US 2013/0194260 A1 Aug. 1, 2013

(30) Foreign Application Priority Data

Aug. 1, 2011 (EP) .................................... 11006316

(51) Int. Cl.
| | |
|---|---|
| G06T 17/00 | (2006.01) |
| G09G 5/00 | (2006.01) |
| G06T 17/05 | (2011.01) |
| G06T 19/00 | (2011.01) |

(52) U.S. Cl.
CPC ................ *G06T 17/05* (2013.01); *G06T 19/00* (2013.01); *G06T 2210/36* (2013.01)

(58) Field of Classification Search
USPC ....................................................... 345/428
See application file for complete search history.

(56) References Cited

U.S. PATENT DOCUMENTS

| | | | |
|---|---|---|---|
| 7,262,713 B1* | 8/2007 | Vogl et al. ..................... | 340/970 |
| 2010/0033481 A1* | 2/2010 | Baxes et al. ................... | 345/420 |
| 2013/0194260 A1* | 8/2013 | Kunath et al. ................ | 345/420 |

OTHER PUBLICATIONS

David Luebke, Martin Reddy, Jonathan D. Cohen, Amitabh Varshney, Benjamin Watson and Robert Huebner, 2003 Elsevier Inc., Level of Detail for 3D Graphics, Chapter 3, Simplification of Error Metrics, http://www.sciencedirect.com/science/book/9781558608382.*

Over M et al: "Generating web-based 3D City Models from OpenStreetMap: The current situation in Germany", Computers Environment and Urban Systems, New York, NY, US, vol. 34, No. 6, Nov. 1, 2010, pp. 496-507.

Xuan Sun et al: "Automated abstraction of building models for 3D navigation on mobile devices", Proceedings 2011 19th International Conference on Geoinformatics IEEE Piscataway, NJ, USA, Jun. 26, 2011, p. 6.

Glander T. et al: "Abstract representations for interactive visualization of virtual 3D city models", Computers, Environment and Urban Systems—Geoinformation Generalisation and Multiple Representation Sep. 2009 Elsevier Ltd GBR, vol. 33, No. 5, Sep. 2009, pp. 375-387.

"1-6, 9-1117, 19-27, 47-53, 69-79, 87-90, 185-190" In: Luebke D, Reddy M Cohen J D et al: "Level of Detail for 3D Graphics", 2003, Morgan Kaufmann Publishers, Amsterdam.

(Continued)

*Primary Examiner* — Leon T Cain, II
(74) *Attorney, Agent, or Firm* — Artegis Law Group, LLP

(57) ABSTRACT

A system for visualization of 3D objects and/or 3D terrain includes a processor, a display in communication with the processor, and a range metering device in communication with the processor. The system visualizes the 3D objects and/or the 3D terrain based upon their respective distances from the mobile device and based upon a respective parameter measuring the detail of the 3D object and/or the 3D terrain.

14 Claims, 3 Drawing Sheets

(56) References Cited

OTHER PUBLICATIONS

Michael Garland: "Multiresolution modeling: Survey & Future Opportunities", EUROGRAPHICS 99, EUROGRAPHICS Association, 1999.

European Office Action for EP 11006316.1, Jun. 18, 2014.

European Search Report dated Jan. 30, 2012.

M. Over, et al., "Generating web-based 3D City Models from OpenStreetMap: The current situation in Germany," Computers, Environment and Urban Systems, 34, 2010, pp. 496-507.

Tassilo Glander, et al., "Abstract representations for interactive visualization of virtual 3D city models," Computers, Environments and Urban Systems, 33, 2009, pp. 375-387.

Xuan Sun, et al., "Automated Abstraction of Building Models for 3D Navigation on Mobile Devices," IEEE, 2011.

David Luebke, et al., "Level of Detail for 3D Graphics," Morgan Kaufmann Publishers, 2003.

Michael Garland, "Multiresolution Modeling: Survey & Future Opportunities," Eurographics, STAR, 1999.

\* cited by examiner

SYSTEM FOR VISUALIZING THREE DIMENSIONAL OBJECTS OR TERRAIN

BACKGROUND OF THE INVENTION

1. Priority Claim

This application claims the benefit of priority from European Patent Application 11 006 316.1, filed Aug. 1, 2011, which is incorporated by reference.

2. Technical Field

The present invention relates to a method of visualization of 3D objects and/or 3D terrain using a device having a display and a range metering device.

3. Related Art

Portable handheld devices or embedded devices, vehicle navigational systems, but also navigational systems for cyclists, hikers or pedestrians are known in the state of the art. Such devices often present a 3D view from the current position of its user applying the device for orientation, guiding through often a multitude of sometimes unknown objects and or terrain. These devices provide the user with an approximation of the 3D world he/she encounters from his/her current viewpoint.

SUMMARY

A system for visualization of 3D objects and/or 3D terrain provides geometric representation and visualization of three dimensional objects and terrain. The system includes a method to be executed by a processor provides for visualization of three dimensional objects, 3D objects, and/or 3D terrain using a mobile device having a display and a range metering device, comprising visualizing the 3D objects and/or the 3D terrain based upon their respective distances from the mobile device and based upon a respective parameter measuring the detail of the 3D object and/or the 3D terrain.

The geometric representation may be based on the respective distances from a viewer, that is, a user of the device to the respective 3D objects and terrain. The detail of the 3D objects and/or the 3D terrain may be described by a respective parameter measuring the detail of the 3D object and the 3D terrain. The detail of the objects and terrain may be known beforehand. Further, the distances to the objects may be provided very quickly, since, in a specific projection scheme. In a central or camera projection the distances (intra distances of the scene) between the various objects and terrain to be visualized are typically already known, only the distance from the viewer to a specific point of the scene needs to be determined. Thus, both parameters may be provided very quickly such that a fast and easy visualization of the 3D objects and the 3D terrain is possible.

In the method described above, typically each of the 3D objects may have a geometric representation having a Level of Detail ("LoD") selected from a plurality of different LoDs for the 3D objects. Thus, sets of levels of detail for each of the 3D objects may be provided, which are easily accessible and may provide a fast geometric representation of the 3D objects.

In the method described above, the 3D terrain may comprise one or more parts, where each of the parts typically has a geometric representation having a LoD selected from a plurality of different LoDs for the 3D terrain corresponding to a Digital Terrain model, DTM, having a plurality of tiled surfaces, particularly a plurality of different triangulated irregular networks ("TINs").

In this respect, the term level of detail may also be used for 3D terrain, where different levels of details correspond to different TINs. The 3D terrain may thus have different parts with different resolutions, such as a flat land with meadows or fields may require a different representation than mountainous or hilly areas, parks or forest. In the method described above the LoDs for 3D objects comply with at least one of the Navigation Data Standard or the CityGML standard.

The levels of detail thus may comply with modern industry standards which gear towards standardizing information content for mobile devices, in particular navigational systems, handhelds, smartphones etc. Using these standards also provides the benefits of having the opportunity to easily upgrade card maps for the above-mentioned systems. The application and the data thus are separable. The version management of the card data is simplified, the format is compact and the data may be applicable basically worldwide.

The method as described above may further comprise the steps of: (a) determining the distances from the range metering device to each of the 3D objects and/or the parts of the 3D terrain visible from the position of the range metering device; (b) selecting for each of the 3D objects and/or each of the parts of the 3D terrain a respective geometric representation having a Level of Detail, LoD, from the plurality of LoDs for 3D objects and 3D terrain, respectively, where each LoD corresponds to a predetermined distance or range of distances from the mobile device, for displaying the 3D objects and/or the 3D terrain, respectively, according to the determined distances of step (a); (c) in case an overall parameter is set, deciding for at least some of the 3D objects and/or at least some parts of the 3D terrain on representing these 3D objects and/or these parts of the 3D terrain, using geometric representations having LoDs from the plurality of LoDs for 3D objects and 3D terrain, respectively, which differ from the LoDs selected in step (b), where for each of these 3D objects and/or these parts of the 3D terrain the decision is based on the respective parameter; and displaying each of the 3D objects and/or the parts of the 3D terrain according to the geometric representations having the LoDs selected in steps (b) and (c).

The distances may be determined by a range metering device, such as a range finder, a small camera, for instance a digital camera, or indirectly via satellite navigational information, for example global positioning system, GPS. The LoDs for 3D objects may correspond to a predetermined distance or ranges of distances. The number of ranges may differ according to the application environment. An exemplary set of ranges may be close distances, mid-range distances and far distances, but a finer or coarser set may be provided.

Thus typically a mapping between an LoD and a range of distances may exist. Typically, this mapping may be a one-to-one mapping. The LoDs for 3D terrain typically differ from the LoDs for 3D objects. Also, the set of ranges corresponding to the LoDs for terrain may differ from the set of ranges selected for distances to 3D objects. It is also possible, to use the same set of ranges for both 3D objects and 3D terrain. The geometric representation for at least some of the 3D objects and/or at least some parts of the 3D terrain may be changed from the geometric representation according to the mapping in step (b) by deciding on a respective parameter. That is, this parameter is a specific parameter provided for each object and taken into account for a decision for at least one or some objects. Similarly, for 3D terrain the parameter is a specific parameter for parts of the 3D terrain, provided for each of the parts and taken into account for a decision for at least one or some parts of the terrain.

The displaying of the 3D objects and/or the 3D terrain visible from the current position of the device thus may take into account the decision of step (c). It may further be possible to limit displaying of the scene only to 3D objects or only to 3D terrain, in specific application situations. The respective parameter may be predetermined for all 3D objects and/or 3D terrain. It may also be possible that some of the 3D objects or 3D terrain may be exempted from the above method or the predetermined respective parameter may be preset such that for those 3D objects and/or 3D terrain the respective LoD will not change. That is, it may be predetermined/preselected that for those 3D objects and 3D terrain a fixed geometric representation may be appropriate. It may be possible for the user to override the settings for each respective parameter.

An overall parameter may for example refer to a physical or logical switch. If the overall parameter is set to a value indicating that step (c) is to be performed, at least some of the 3D objects and/or some parts of the 3D terrain may participate in the method as described above.

In the method as described above, the overall parameter may be entered by a user or may be preset to a default value. The user may therefore press a button, touch a screen or enter a command by voice to activate the above-described method. Further, the overall parameter may be set to a default value when activating the device. The default value may be a choice/setting of the overall parameter from a previous session or a factory setting default value.

The method as described above may further comprise in step (c) comparing the respective parameter to a predetermined threshold, where if the respective parameter is less than or equal to the predetermined threshold, selecting for displaying the respective 3D object and/or the part of the 3D terrain a respective geometric representation having an LoD which is less detailed than the LoD selected in step (b), unless the geometric representation selected in step (b) comprises already the least level of detail of the plurality of LoDs for 3D objects and 3D terrain, respectively. The threshold may be predetermined. It may be possible to change the threshold during use of the device. For example, the user may interact to set or reset the threshold. It may also be possible to have an object-specific threshold for each object. Thus, the above-described method provides a combination of ease of use together with the possibility to individually tailor the system to the user's need.

The method as described above may further comprise predetermining the respective parameter for each of the geometric representations of the 3D objects and/or the part of the 3D terrain selected in step (c). The respective parameter for each 3D object and/or each of the parts of 3D terrain may be determined in advance. That is, the mobile device loses no time for determining the respective parameter on the fly but has basically instant access to the respective parameter. The determination of the respective parameter, in particular if model data of the device have been updated may be performed after the updating of the model data. It may also be possible to provide the parameter together with the update of the model data.

In the method as described above, for the 3D objects, the respective parameter may be predetermined by comparing the geometric representation having the LoD selected in step (b), named Gold, and a different geometric representation having a different LoD, named $G_{new}$.

In case the geometric representation for 3D objects and/or 3D terrain, respectively, has not yet reached the LoD providing the least information, such as the coarsest of the LoDs, the geometric representation may be compared with regard to how much detail is provided for the specific object and/or the specific part of the terrain. It should be understood that the method may also be applied for the reverse situation considering an increase of detail. For such an application, the LoD from the plurality of LoDs having the highest information, such as the finest details that need to be considered.

In the method as described above the step of comparing the geometric representations for the 3D objects may comprise the steps of: (1) for all vertices of $G_{new}$ determining the distances to all surfaces of the 3D object represented by Gold, (2) for all vertices of $G_{new}$ determining the minimal distance of the distances of step (c1); and (3) determining the maximum of the minimal distances of step (2).

In the method as described above the step of comparing the geometric representations for the 3D objects may comprise: (1) determining the minimum bounding box, $B_{min}$, for $G_{new}$; (2) for all vertices of $B_{min}$ determining the distances to all surfaces of the 3D object represented by Gold; (3) for all vertices of $B_{min}$ determining the minimal distance of the distances of step (2); and (4) determining the maximum of the minimal distances of step (c2).

By determining the minimum bounding box, a very fast means may be provided for comparing a previous, old, and a new geometry. It should be understood that the new geometry is not necessarily restricted to the immediate next LoD of the list of LoDs but may select an LoD of a next but one level or vice versa, provided the lowest or highest level of detail of the plurality of LoDs has not yet been reached.

In the above-described method for the parts of the 3D terrain the respective parameter may be predetermined by comparing the geometric representation having the LoD selected in step (b), named Told, and a different geometric representation having a different LoD, named $T_{new}$.

The comparison of parts of the 3D terrain thus is very similar to the comparison of different level of detail. Therefore, both may be performed very quickly.

In the above-described method the step of comparing the geometric representations for the 3D terrain may comprises: (1) for all triangles/tiles of $T_{new}$ determining the distances to all triangles/tiles of the 3D terrain represented by Told covered by $T_{new}$; (2) for all triangles/tiles of $T_{new}$ determining the minimal distance of the distances of step (1); and (3) determining the root mean square of the minimal distances of step (2). Thereby, a robust measure for comparing old and new 3D terrain may be provided.

In the above-described method, the mobile device may be a mobile phone, a smartphone, a tablet device or a vehicle navigational system typically comprising a non-volatile memory and a data connection, preferably a wireless data connection, where the plurality of LoDs for 3D objects and 3D terrain, respectively, typically are stored in the non-volatile memory, where the LoDs may be downloadable via the data connection.

The above method may thus be implemented on modern mobile devices. Typically these devices are small and light-weight. The method may also be performed on embedded devices. The method may further be a computer program product comprising at least one computer readable medium having computer-executable instructions for performing the steps of the method as described above when run on a computer.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the FIG. 1 illustrates a schematic representation of an operational flow diagram of a system for visualization of 3D objects and/or 3D terrain according to an example.

DETAILED DESCRIPTION OF THE PREFERRED EMBODIMENTS

Figure 1:
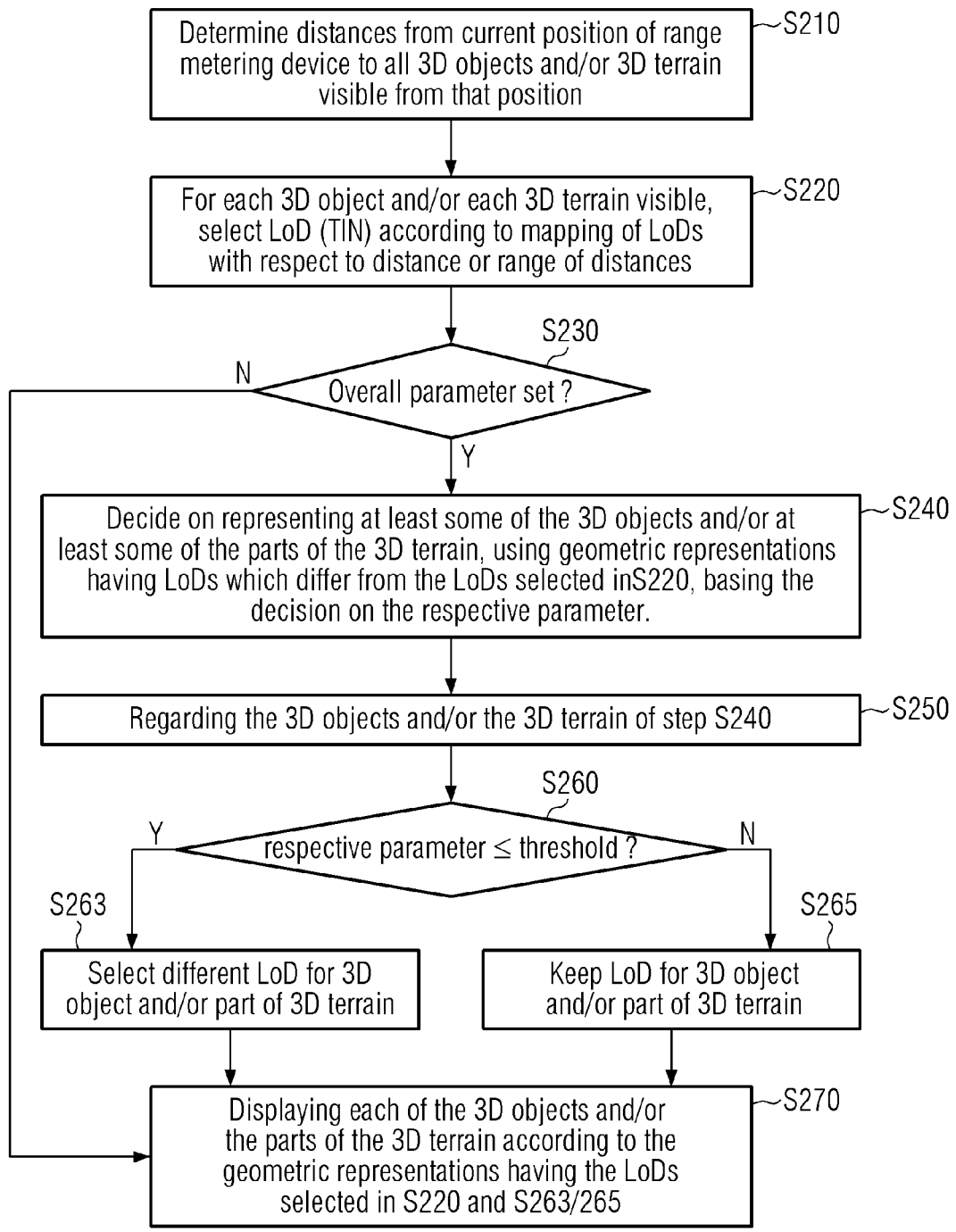

Process and rendering of 3D objects often utilize polygon meshes. A polygon mesh or unstructured grid denotes a set or a collection of vertices, edges and faces/surfaces that define the shape of a polyhedral 3D object in graphics representation and in solid modeling. The faces can consist of triangles, quadrilaterals or other simple convex polygons, since this can simplify rendering by generating the object from the underlying model. Alternatively, the faces may be composed of more general concave polygons, or polygons with holes.

For a graphics representation which may be used in devices such as mobile devices, the scene complexity or scene realism can be balanced against the rendering speed, or how much information is needed for the user using the device. In particular for navigational systems, the user may not need much detailed information for each and every object or terrain displayed in the scene in front of him. Some information may even be reduced to serve as markers or beacons much like a light house.

In particular for vehicle navigational systems, the speed of rendering the information may be an essential quality of the system. One might therefore attempt to reduce the complexity of the scene in order to accelerate the frames displayed by the system. Thus, the number of polygons used for the above-mentioned approximation of the objects may be reduced. This may be done for the entire scene.

A more refined approach may attempt to take into account that representations of objects may be different for each object. For vehicle navigational systems, for instance, as an object is depicted as farther away from the viewer, such as, the driver or passengers of the vehicle, an increasingly simpler mesh corresponding to coarser representation may be used to render the object. The above can be described as the concept of Level of Detail ("LoD") where each object may have a number of different representations.

The above can refer in particular to three dimensional objects that frequently occur in urban, inhabited areas, such as houses, apartment buildings, towers, human-made landmarks, etc. This list may also include streets, as well as any traffic means, railways, tramway/streetcar ways. The underlying models can represent common information models for the representation of sets of such three dimensional objects. Such models may provide definitions of classes and relations for the most relevant topographic and/or landmark objects in cities and regional models with respect to at least some of their geometrical, topological, and/or appearance properties. This may also include information of interest to tourists. These models further may include generalization hierarchies between themes, aggregations, relations between objects, and spatial properties.

Similarly, for terrain, digital elevation models ("DEM") digital surface models ("DSM") or digital terrain models ("DTM") may represent the surface of terrain in a three dimensional representation. A digital terrain model can represent the bare ground surface but without any objects on it, that is without buildings and also without plants.

The quality of such models has improved over recent years with the advent of radar satellites, earth observation satellites or space shuttle radar topography missions. The quality may depend on, for example, the roughness of the terrain, the sampling density, the pixel size or grid resolution, the vertical resolution and methods of terrain analysis and interpolation. The data for these models may be obtained by data collection systems, such as Light Detection And Ranging ("LIDAR"), stereoscopic photogrammetric approaches taking into account aerial surveys, global positioning system ("GPS"), topographic maps, manually by total station, theodolite, Doppler radar or focus variation.

The management of these representations for different objects, regarding which representations of objects to choose as an appropriate representation to yield the information needed for the user at the very moment can be important. Also, the modeling may be view dependent. This may also be combined with the need to provide this information as quickly as possible, which for navigational systems, especially in vehicles, can be very important. Such systems may use one specific level of detail for rendering the 3D objects, for example buildings and terrain, depending on the current viewpoint. However, this may still include too much details which may overload the current scene with information unnecessary for the user, for example a driver, at the very moment. As a concrete example, the Cologne cathedral in Cologne, Germany is located right next to the Cologne main train station. A similar level of detail used for three dimensional representations of both may provide too much information, which can be unnecessary for the current situation the user faces. Similar problems occur in mixed representations with three dimensional objects and terrain.

In FIG. 1, a schematic representation of an example operational flow diagram of the system, which may be used for visualization of 3D objects and/or 3D terrain. It should be appreciated that in the depicted scheme both 3D objects and 3D terrain may be treated together or independently. It should also be appreciated that in some example systems the user may select to only have 3D objects shown or only 3D terrain.

In step S210, the distances from current position of range metering device to all 3D objects and/or 3D terrain visible from the position of the range metering device are determined. The range metering device may view a certain stereoscopic angle/ forward cone of the field of view. This angle may less than or at most equal to $2\pi$ steradian. It may be similar to a human or camera like field of view. The system typically refers to still objects, such that the intra object distances are usually known beforehand and only a projection scheme and the current perspective need to be taken into account.

In step S220, for each 3D object and/or each 3D terrain visible in the previous step S210, levels of detail, LoDs, for 3D object and/or levels of detail for 3D terrain, such as triangulated irregular networks, TINs, are selected with respect to the distances determined/measured in step S210. Typically, the determined distances fall into a predetermined range or bin of distances. Typically, a plurality of such ranges exists. For example, there may be five predetermined ranges or bins.

It a simpler example there may exist three ranges of distances. These ranges of distances may be mapped to a specific LoD. That is, for example, distances of 500 m-1000 m may correspond to a first LoD named LoD1. This may be the coarsest LoD. Distances between 500 m-250 m may correspond to a second LoD, named LoD2. Distances closer/nearer than 250 m may correspond to a third LoD, name LoD3. LoD3 may, for example, represent the most refined LoD providing the most details.

Since different 3D object and/or 3D terrain may have different complexity of their respective shape, outer surface, texture etc., the operation continues in step S230 for checking if an overall parameter such as a switch, which may be a logical switch is set. If the overall parameter is set, the system may continue to follow steps S240-S265.

In step S240 it is decided on representing at least some of the 3D objects and/or at least some of the parts of the 3D terrain, using geometric representations having LoDs which differ from the LoDs selected in S220, basing the decision on a respective parameter. The respective parameter may be predetermined. The respective parameter may also be preset by the user. Typically the predetermining or presetting of the respective parameter may be performed independently of the current viewing situation. All 3D objects and/or parts of 3D terrain may be taken into account for the decision. It may be, however, that for some of the 3D objects and/or some the 3D terrain, the respective LoD or TIN should remain unchanged. In that case, only a subset of 3D objects and/or parts of 3D terrain are taken into account.

In step S250, for the 3D objects and/or 3D terrain regarded in step S240, the operation continues. The respective parameter for each of the 3D objects and/or 3D terrain should be compared to a threshold, as is indicated in step S260. If the respective parameter is less than or equal to the threshold, as indicated in step S263, the respective LoD may be changed, for example into a coarser LoD with less information. Otherwise, as indicated in step S265, the previously selected/mapped LoD may be kept.

In the above example of three LoD ranges, supposing that a 3D object, for example a landmark like a medieval tower is located 200 m away from a user using a device that includes at least a part of the system. For instance, the user may be driving a car using a vehicle navigational system. This distance may be determined by the range metering device. Typically, for scales of distances regarded here, the user and the device are located largely at the same position. The mapping of ranges of distances as given in the above example would thus map the determined distance of 200 m to LoD3, which is the most refined LoD in the example. The respective parameter may be predetermined. Predetermining the respective parameter is further discussed with respect to FIGS. 2A and 2B, see below. The respective parameter may be less than a predetermined threshold. In that case, for example, the system may choose the next coarser LoD, LoD2 of the example, for geometric representation of the 3D object, here the medieval tower. It should be appreciated that also the next but one geometric representation may be selected, such as LoD1. In step S270, each of the 3D objects and/or the parts of the 3D terrain regarded in step S210 are displayed according to the geometric representations having the LoDs selected in steps S220 and steps S263/265.

Figure 2A:
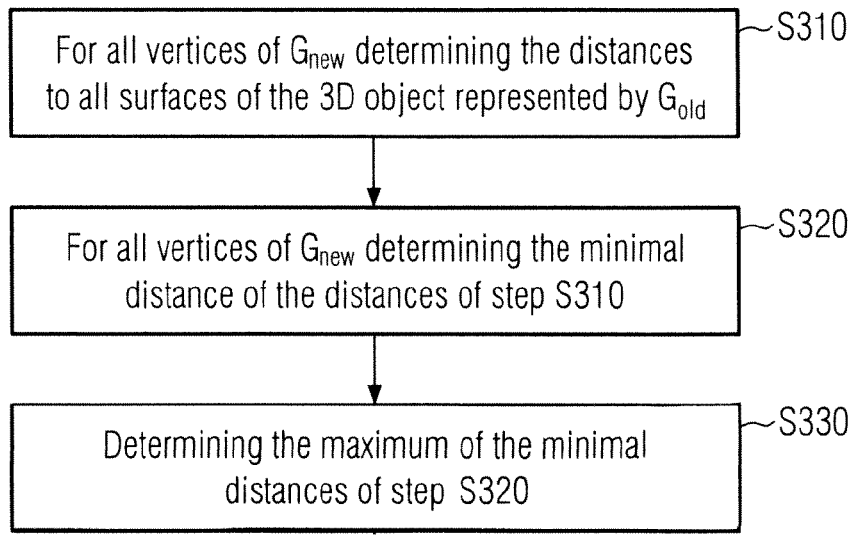
FIG. 2A illustrates a schematic representation of operation of the system to compare a new and an old geometric representation for 3D objects according to an example.
Figure 2B:
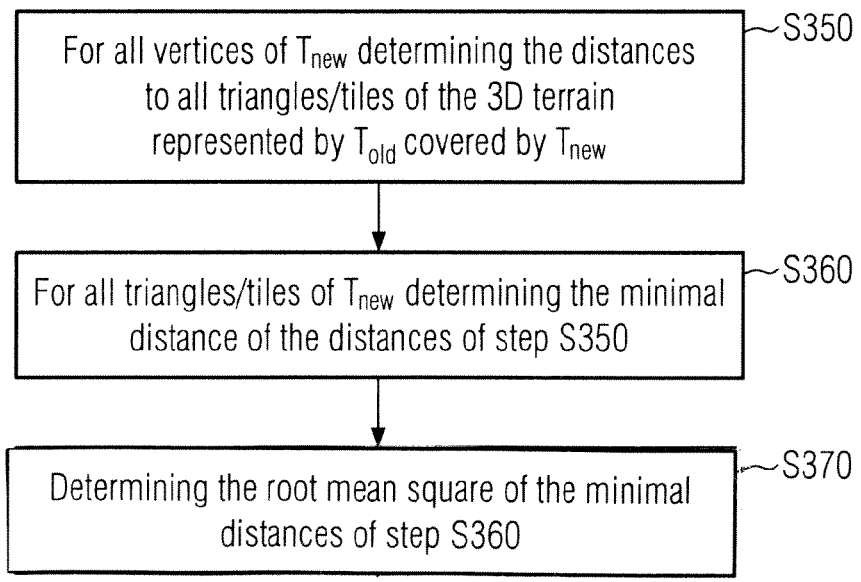
FIG. 2B illustrates a schematic representation of operation of the system to compare a new and an old geometric representation of parts of 3D terrain according to an example.

As discussed above, the respective parameter for each of the 3D objects and/or for each of the 3D terrain may be predetermined. FIG. 2A depicts a schematic representation of predetermining the respective parameter for each of the 3D objects. Likewise, FIG. 2B depicts a schematic representation of predetermining the respective parameter for each of the 3D terrain.

FIG. 2A shows an example of an operational flow diagram describing comparison of a new geometric representation and a previous, old representation of a 3D object. The idea is to find out if a new geometric representation is suitable for the respective 3D object. This may be found out in an automated way. The new geometric representation typically may include less detail than the previous one.

In step S310, the comparison of the geometries is started. For all vertices of the new geometric representation, $G_{new}$ the distances to all surfaces of the 3D object represented by the old geometric representation, Gold are determined. The distance of a point to a surface in Euclidian space may be determined using the Hesse normal form. To illustrate this, suppose the new geometric representation would correspond to a rectangular box. Such a box would have 8 vertices. Suppose the previous, old geometry had 20 faces/surfaces. Thus, for each of the 8 vertices, 20 distances to the faces of the old geometry would be determined.

In step S320, the minimal distance of the distances of step S310 is determined. That is, for example, for n vertices of the new geometric representation (typically, n, being an integer, is larger than or equal to 3), n minimal distances would be determined. For illustration, for the above discussed exemplary new geometric representation of a rectangular box, the result of this step would provide 8 minimal distances.

In step S330, for all vertices of $G_{new}$, that is, for all of the minimal distances, the maximum of the minimal distances of step S320 is determined. After this step, one maximum valued is determined. In the above example, out of the 8 minimal distances the maximum is select.

By the above, the respective parameter for the respective 3D object is determined. This parameter may be compared to a respective threshold for the 3D object.

The above described method may be modified such that at least for the new geometry $G_{new}$, instead of the entire set of vertices of that geometric representation, always a rectangular box is used. A simple and non-ambiguous choice would be to select the minimum bounding box around the new geometry. This would then reduce the number of vertices to be treated for the new 3D geometry to 8, as already indicated in the above example.

FIG. 2B depicts an example operational flow diagram of the system performing comparison of a new geometric representation and a previous, old representation for parts of 3D terrain. The entire 3D terrain or at least parts of it may be depicted with a different resolution than in a previous representation. The new resolution may correspond to a new level of detail, typically showing less detail than the previous level of detail for the respective part of the 3D terrain. As an example, there may be three levels of details for terrain, name LoD1 or TIN1, LoD2 or TIN2 and LoD3 or TIN3. In this TIN1 might show the least details, which would correspond to the coarsest triangulation. TIN3 may show the most details have the finest triangulation. The mapping of ranges of distances to the three levels of detail of this example shows the three TINs may be similar to the one discussed with respect to the example given with regard to FIG. 2A. However different ranges of distances may be chosen. Also, the number of levels of details, here TINs, may be different from the number of levels of detail indicated with respect to the example given above. For instance, there may be five LoDs for 3D objects but only three LoDs/TINs for 3D terrain.

In step S350, for all vertices of $T_{new}$, where $T_{new}$ represents at least a part of a 3D terrain, the distances all triangles/tiles of the 3D terrain represented by the previous Told covered by $T_{new}$ are calculated.

In step S360, the method continues and of the distances determined in step S350, for all triangles/tiles of the new geometric representation, $T_{new}$, the minimal distance of the distances determined in step S350 is determined. As a result of this step, a set of minimal distances has been achieved.

In step S370 the root mean square of the minimal distances is determined. Similar to step S330 for 3D objects, one measure for the respective geometric representation of at least a part of the 3D terrain has been determined which may be compared to a predetermined threshold. Based on the comparison, a different level of detail, here TIN, may be selected for the respective 3D terrain or at least parts of that 3D terrain.

Figure 3:
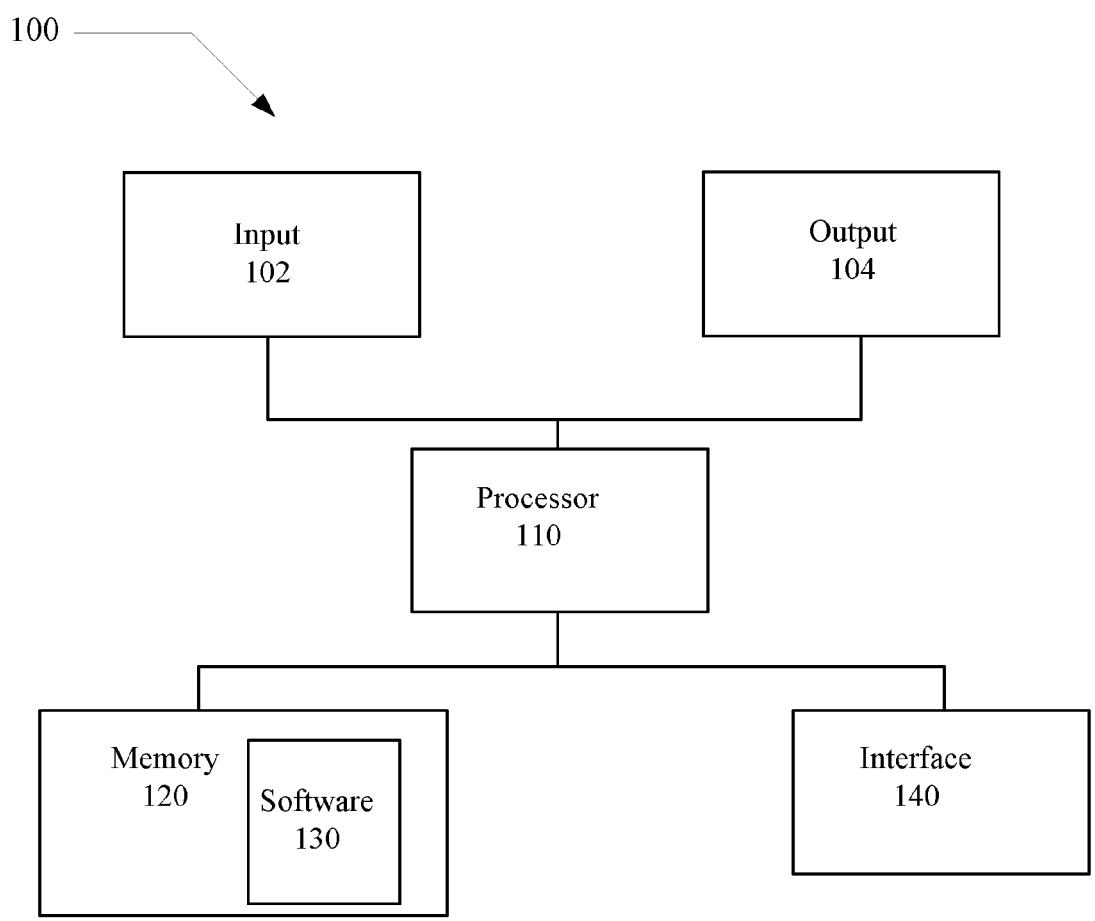
FIG. 3 illustrates an example of the system for visualization of 3D objects and/or 3D terrain.

FIG. 3 is an example of a system for visualization of 3D objects and/or 3D terrain. In this example, the system is a navigation system 100, but the system may take any number of forms suitable for executing the methods described above and shown in FIGS. 1, 2A, and 2B. For example, the system may be a general purpose computer, or may be a dedicated device such as a handheld navigations unit or mobile device, such as a mobile phone.

The navigation system 100 may have one or more input 102 and outputs 104. The input 102 may be a range metering device, such as a range finder, a small camera, for instance a digital camera, or indirectly via satellite navigational information, for example global positioning system, GPS In addition to one or more inputs 102 and one or more outputs 104, the navigation system 100 may include a processor 110, a memory 120, software 130, and an interface 140.

The navigation system 100 may include analog signal processing and digital signal processing capability. The processor 110 may include one or more devices capable of executing instructions to perform one or more operations within the navigation system 100. In FIG. 3 the processor 110 is incorporated into the navigation system 100. The processor 110 may be one or more general processors, digital signal processors ("DSP"), application specific integrated circuits ("ASIC"), field programmable gate arrays ("FPGA"), server computers, networks, digital circuits, analog circuits, combinations thereof, or other now known or later developed devices for analyzing and processing digital and analogue data. The processor 110 may operate in conjunction with a software program, such as instructions or code and data stored in the navigation system 100.

The processor 110 may be coupled with memory 120, or memory 120 may be a separate component. Software 130 may be stored in memory 120. The software 130 may contain the methods described in the paragraphs above and shown in FIGS. 1, 2A, and 2b. Memory 120 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 120 may include a random access memory for the processor. Alternatively, the memory 120 may be separate from the processor, such as a cache memory of a processor, the system memory, or other memory. The memory may be an external storage device or database for storing recorded data. Examples include a hard drive, compact disc ("CD"), digital video disc ("DVD"), memory card, memory stick, floppy disc, universal serial bus ("USB") memory device, or any other device operative to store data. The memory 120 may be operable to store instructions executable by the processor.

The navigation system 100 may have an interface 140. The interface 140 may include knobs, switches, sliding components, buttons, a mouse, keyboard, a display, a touch screen or other devices or mechanisms capable of receiving user inputs for adjusting, modifying or controlling one or more features of the navigation system 100 and providing outputs sensed by a user. The interface 140 may be used to manipulate one or more characteristics, components, or features of the navigation system 100. For example, the navigation system 100 may include a slider which, when moved, modifies the volume for one or more of the received signals processed by the console. In another example, the interface 140 may include a knob, that when turned, modifies the gain applied by one or more amplifiers in the navigation system 100. In still another example, the navigation system 100 may be a data input location displayed in a display and a corresponding data input device in which parameters, such as a gain, a threshold, or any other parameter may be entered by a user of the navigation system 100.

While the invention has been shown and described with reference to a certain preferred embodiments thereof, it will be understood by those skilled in the art that various changes in form and details may be made therein without departing from the spirit and scope of the invention as defined by the appended claims. Accordingly, the invention is not to be restricted except in light of the attached claims and their equivalents.

We claim:

1. A method for visualization of three-dimensional (3D) objects and 3D terrains, the method comprising:
    providing a device having a display and a storage device, the storage device having a plurality of stored levels of detail, the levels of detail representing a detail level of the 3D objects and 3D terrains; and
    outputting a first 3D terrain of the 3D terrains and a first object of the 3D objects on the display, wherein the outputting comprises:
        computing, for each vertex of a first geometric representation of the first 3D object, a first plurality of distances from the vertex to each surface of a second geometric representation of the first 3D object, wherein the first geometric representation of the first 3D object and the second geometric representation of the first 3D object have different levels of detail selected from the plurality of stored levels of detail;
        determining, for each vertex of the first geometric representation of the first 3D object, a first minimal distance of the first plurality of distances;
        computing, for each vertex included in a first geometric representation of the first 3D terrain, a second plurality of distances from the vertex to each polygon included in a second geometric representation of the first 3D terrain that is covered by the first geometric representation of the first 3D terrain, wherein the first geometric representation of the first 3D terrain and the second geometric representation of the first 3D terrain have different levels of detail selected from the plurality of stored levels of detail;
        determining, for each vertex included in the first geometric representation of the first 3D terrain, a second minimal distance of the second plurality of distances;
        outputting the first geometric representation of the first 3D object if a maximum value of the first minimal distances is less than a first threshold, or outputting the second geometric representation of the first 3D object if the maximum value is greater than the first threshold; and outputting the first geometric representation of the first 3D terrain if a root mean square (RMS) value of the second minimal distances is less than a second threshold, or outputting the second geometric representation of the first 3D terrain if the RMS value is greater than the second threshold.

2. The method of claim 1, wherein the plurality of stored levels of detail for 3D objects and 3D terrains comply with at least one of a Navigation Data Standard or a CityGML standard.

3. The method of claim 1, further comprising, responsive to receiving user selection of a first level of detail of the plurality of stored levels of detail, outputting the first 3D object at the first level of detail.

4. The method of claim 1, wherein the first plurality of distances from each vertex of the first geometric representation of the first 3D object are computed from each vertex of a bounding box of the first geometric representation of the first 3D object.

5. A system, comprising:
a processor;
a storage device in communication with the processor, the storage device storing a plurality of stored levels of detail, the levels of detail representing detail levels of 3D objects and 3D terrains; and
the processor configured to output a first object of the 3D objects for display, wherein the outputting comprises:
  determining a maximum minimal distance of a plurality of first minimal distances, wherein each of the plurality of first minimal distances are computed by:
    computing, for each vertex of a first geometric representation of the first 3D object, a first plurality of distances from the vertex to each surface of a second geometric representation of the first 3D object, wherein the first geometric representation of the first 3D object and the second geometric representation of the first 3D object have different levels of detail selected from the plurality of stored levels of detail;
    determining, for each vertex of the first geometric representation of the first 3D object, the first minimal distance of the first plurality of distances; and
    determining the maximum minimal distance of the plurality of first minimal distances; and
  outputting the first geometric representation of the first 3D object if the maximum minimal distance is less than a first threshold, or
  outputting the second geometric representation of the first 3D object if the maximum minimal distance is greater than the first threshold.

6. The system of claim 5, wherein the outputting further comprises:
outputting a first 3D terrain of the 3D terrains, by:
  computing, for each vertex included in a first geometric representation of the first 3D terrain, a second plurality of distances from the vertex to each polygon included in a second geometric representation of the first 3D terrain that is covered by the first geometric representation of the first 3D terrain, wherein the first geometric representation of the first 3D terrain and the second geometric representation of the first 3D terrain have different levels of detail selected from the plurality of stored levels of detail;
  determining, for each vertex included in the first geometric representation of the first 3D terrain, a second minimal distance of the second plurality of distances; and
  outputting the first geometric representation of the first 3D terrain if a root mean square (RMS) value of the second minimal distances is less than a second threshold, or
  outputting the second geometric representation of the first 3D terrain if the RMS value is greater than the second threshold.

7. The system of claim 5, wherein the plurality stored levels of detail for the 3D objects and the 3D terrains comply with at least one of a Navigation Data Standard or a CityGML standard.

8. The system of claim 5, wherein the outputting further comprises, responsive to receiving a user selection of a first level of detail of the plurality of stored levels of detail, outputting the first 3D object at the first level of detail.

9. The system of claim 5, wherein the first plurality of distances from each vertex of the first geometric representation of the first 3D object are computed from each vertex of a bounding box of the first geometric representation of the first 3D object.

10. A non-transitory computer-readable storage medium, comprising computer code that, when executed by a processor, outputs a first 3D terrain for display, by performing the steps of:
computing, for each vertex included in a first geometric representation of the first 3D terrain, a first plurality of distances from the vertex to each polygon included in a second geometric representation of the first 3D terrain that is covered by the first geometric representation of the first 3D terrain, wherein the first geometric representation of the first 3D terrain and the second geometric representation of the first 3D terrain have different levels of detail selected from the plurality of stored levels of detail;
determining, for each vertex included in the first geometric representation of the first 3D terrain, a first minimal distance of the first plurality of distances; and
outputting the first geometric representation of the first 3D terrain if a root mean square (RMS) value of the plurality of first minimal distances is less than a second threshold, or
outputting the second geometric representation of the first 3D terrain if the RMS value is greater than the second threshold.

11. The computer-readable storage medium of claim 10, further comprising:
outputting a first object of the 3D objects, comprising:
  determining a maximum minimal distance of a plurality of second minimal distances, wherein each of the plurality of second minimal distances are computed by:
    computing, for each vertex of a first geometric representation of the first 3D object, a second plurality of distances from the vertex to each surface of a second geometric representation of the first 3D object, wherein the first geometric representation of the first 3D object and the second geometric representation of the first 3D object have different levels of detail selected from the plurality of stored levels of detail;

determining, for each vertex of the first geometric representation of the first 3D object, the second minimal distance of the second plurality of distances; and determining the maximum minimal distance of the plurality of second minimal distances; and outputting the first geometric representation of the first 3D object if the maximum minimal distance is less than a first threshold, or outputting the second geometric representation of the first 3D object if the maximum minimal distance is greater than the first threshold.

12. The computer program product of claim 11, wherein the plurality of stored levels of detail for the 3D objects and the 3D terrains comply with at least one of a Navigation Data Standard or a CityGML standard.

13. The computer program product of claim 11, wherein the outputting further comprises, responsive to receiving a user selection of a first level of detail, of the plurality of stored levels of detail, outputting the first 3D object at the first level of detail.

14. The computer program product of claim 11, wherein the second plurality of distances from each vertex of the first geometric representation of the first 3D object are computed from each vertex of a bounding box of the first geometric representation of the first 3D object.

* * * * *